(12) United States Patent
Segel (10) Patent No.: US 7,477,597 B2
(45) Date of Patent: Jan. 13, 2009

(54) RURAL BROADBAND HYBRID SATELLITE/TERRESTRIAL SOLUTION

(75) Inventor: Jonathan Dean Segel, Ottawa (CA)

(73) Assignee: Alcatel Lucent, Paris (FR)

( * ) Notice: Subject to any disclaimer, the term of this patent is extended or adjusted under 35 U.S.C. 154(b) by 780 days.

(21) Appl. No.: 10/935,457

(22) Filed: Sep. 8, 2004

(65) Prior Publication Data

US 2006/0050736 A1      Mar. 9, 2006

(51) Int. Cl.
*H04J 3/14* (2006.01)
*H04B 7/185* (2006.01)

(52) U.S. Cl. ............. 370/230; 370/238; 370/316; 370/341

(58) Field of Classification Search ............. None
See application file for complete search history.

(56) References Cited

U.S. PATENT DOCUMENTS

| | | | | |
|---|---|---|---|---|
| 5,317,566 | A * | 5/1994 | Joshi | 370/238 |
| 5,953,319 | A * | 9/1999 | Dutta et al. | 370/238 |
| 6,115,750 | A * | 9/2000 | Dillon et al. | 709/235 |
| 6,215,772 | B1 * | 4/2001 | Verma | 370/236 |
| 6,289,389 | B1 | 9/2001 | Kikinis | |
| 6,493,556 | B1 | 12/2002 | Stinson | |
| 6,522,865 | B1 | 2/2003 | Otten | |
| 6,591,084 | B1 | 7/2003 | Chuprun | |
| 6,639,898 | B1 * | 10/2003 | Dutta et al. | 370/238 |
| 6,731,931 | B1 * | 5/2004 | Grayson et al. | 455/430 |
| 6,813,259 | B1 * | 11/2004 | Kumar et al. | 370/338 |
| 6,829,221 | B1 * | 12/2004 | Winckles et al. | 370/238 |
| 2003/0003815 | A1 * | 1/2003 | Yamada | 439/894 |
| 2003/0032391 | A1 | 2/2003 | Schweinhart | |
| 2003/0104810 | A1 | 6/2003 | Kindler | |
| 2003/0109220 | A1 | 6/2003 | Hadinger | |
| 2003/0203717 | A1 | 10/2003 | Chuprun | |
| 2004/0071129 | A1 * | 4/2004 | Doerr et al. | 370/352 |

FOREIGN PATENT DOCUMENTS

| | | | |
|---|---|---|---|
| EP | 1 202 507 A | 5/2002 | |
| EP | 1 204 244 A | 5/2002 | |

OTHER PUBLICATIONS

Mogul, J., et al., Path MTU Discovery, Network Working Group, Nov. 1990.
Jacobson, V., et al., TCP Extensions for High Performance, Network Working Group, May 1992.
Mathis, M., et al., TCP Selective Acknowledgement Options, Network Working Group, Oct. 1996.
Allman, M., et al., Enhancing TCP Over Satellite Channels Using Standard Mechanisms, Network Working Group, Jan. 1999.
Baras et al., "Dynamic Routing In Hybrid Networks With Integrated Voice And Data Traffic", American Institute of Physics, Jan. 8, 1995, pp. 21-26, No. 325, NY, NY.

* cited by examiner

*Primary Examiner*—Chi H. Pham
*Assistant Examiner*—Soon D. Hyun (57) ABSTRACT

At a remote site, a satellite route is installed to augment the capacity of a terrestrial route. A specialized forwarding unit is introduced at both ends of these parallel satellite and terrestrial routes. The forwarding unit identifies what type of traffic needs a higher performance forward, and forwards the traffic accordingly. For example, latency-sensitive traffic can be forwarded over the terrestrial route and the latency insensitive traffic can be forwarded over the satellite route.

23 Claims, 4 Drawing Sheets

RURAL BROADBAND HYBRID SATELLITE/TERRESTRIAL SOLUTION

FIELD OF THE INVENTION

The invention is directed to the communication networks and in particular to a rural broadband hybrid satellite/terrestrial network architecture solution.

BACKGROUND OF THE INVENTION

Many rural areas are characterized by small population centers, which are served via a terrestrial infrastructure with limited capacity, typically copper lines or Digital Microwave Radio (DMR). Although it is possible to substitute or augment the terrestrial capacity through adding a satellite route, the communicating applications have no knowledge or ability to control their forwarding through the different links. Therefore latency sensitive traffic such as Voice over IP may be carried on the high-latency satellite route resulting in poor performance, and latency insensitive file downloads may be carried over the terrestrial route, which is a waste of 'premium bandwidth'.

Even where a broadband access multiplexer using DSL is available that is appropriately scaled to the size of the potential market, the cost of backhaul from the rural site to and from the network core may be prohibitive. For example, augmenting the terrestrial route could cost millions of dollars, which the potential new revenue cannot possibly justify. The ability to cost effectively augment limited terrestrial networks with satellite would therefore makes it economically practical to extend broadband services to many areas that would not otherwise receive service.

A satellite is a sophisticated electronic communications relay station orbiting the Earth. Earth stations transmit signals to a satellite in orbit over an uplink. Satellites receive this signal, amplify it, shift it to a different (usually lower) frequency and then feed the outgoing signal into an on-board satellite antenna, where the signal is focused into a beam and sent back to Earth along a downlink. Each satellite downlink has a series or set of "beams" (or sectors) illuminating a footprint on the surface of the Earth. A typical satellite might use sixteen such beams. Sometimes multiple beams at different frequencies are used to illuminate the same given area in a single "beam" pattern, with each being referred to as a "sub-beam." The reception of the satellite signals can either be through a large parabolic antenna at a satellite earth station (e.g. with a 12 meter dish) or received directly at the end customer using a small VSAT (Very Small Aperture 'Terminal' dish (eg. typically less than a meter in diameter). It is also possible for the end customer to transmit back to the satellite, although this generally involves larger dishes than for 'receive only', and different regulatory conditions such as the need for a certified installation may exist.

In general, satellite-based networks offer certain advantages over terrestrial wireless networks in that they can provide rapid deployment of communication services over a wide geographical area, including remote, rural, urban, and inaccessible areas. They are especially well suited to broadcast transmission of latency insensitive traffic such as broadcast television signals. As an interactive data example, satellite data terminals provide credit and debit card transaction network communications from retail stores, gas stations, and banks at hundreds of thousands of locations around the globe. New locations can be provisioned and decommissioned quickly and at a low cost, compared to the time and cost of connecting locations by other methods. As another example, mobile voice networking via satellites enables individuals to utilize portable computers or handheld satellite phones to connect from remote, low-density population rural areas. Satellite-based networks offer more flexibility in allocating capacity to different sites because the common satellite capacity is shared over what is usually a continental area.

For reception of broadband TV signals at a cable network head-end, parabolic dishes at the earth access station point to each satellite to receive the analog and digital feeds from various content providers utilizing the satellite. The access stations receive, demodulate, decrypt, and decode individual programs; the demodulated (baseband) signals are then remodulated according to a TV standard (NTSC, PAL, SECAM) governing the respective region onto a cable TV frequency plan and combined with local off-air signals and cable modem data to form the broadband service that is amplified and relayed along a coaxial cable plant or hybrid fiber optic and coaxial cable infrastructure to the home subscriber.

The growth in IP traffic and the technical advances in packet technologies have made it possible to support what was once a distinct set of parallel networks (voice, video, wireless), on one integrated data network. This has started a move towards a common packet based network with sharing of common network infrastructure to provide services and interoperability of these services. In addition, there is a trend to enable packet based networks with a new set of feature-rich multimedia communication services, such as integrated messaging, multimedia conversations, on-demand multi-point conference, enhanced security & authentication, various classes of media transport services, numerous automations in electronic Internet commerce activities (banking, shopping, customer care, education, etc.).

Systems have been proposed which make use of satellite communications to access the Internet. For example, Direct TV provides high speed Internet access through a plurality of Direct Broadcast System (DBS) satellites, originally constructed to provide satellite television service. Unfortunately, the Direct TV system does not provide a communication link for the user to send information back to the Internet via the satellite. Accordingly, a computer user must utilize a separate terrestrial telephone line through the PSTN system or the like to provide communications to an Internet provider. Though the transmission rate from the computer user through the PSTN system to an Internet provider is substantially slower than the downlink from the DBS satellite, this system is generally usable where no other form of broadband access is available, as the end users of a DBS system are using internet applications such as web browsing and file transfer that generally receive (download) much greater amounts of data from the Internet than they transmit. Accordingly, it is generally acceptable for the computer user's uplink (transmission) rate to be substantially less than the computer user's download rate.

However, the Direct TV system suffers from several disadvantages as a user must have both a satellite receiver and a connection to telephone service and the performance of the system is fundamentally limited by the speed of the dial-up PSTN link, and more seriously by the latency (delay) in the satellite route. The maximum buffer size in standard TCP/IP implementations of 64 kilobytes combined with a typical satellite delay of 560 ms give a maximum throughput of 936 kbits/sec regardless of what higher speeds the satellite route may theoretically support. The standard Windows receive buffer size is just 8760 bytes, which gives an effective end to end rate of 128 kbit/s or less.

All satellite based communication links have a fundamental latency issue in their performance. The communication satellites to which we refer (excluding Low Earth Orbit) sit in Geostationary orbit about 23,000 miles above the equator, and the delay for a signal to reach the satellite and then return to earth is approximately 500 milliseconds. If the system in question also uses a satellite for the return path from the customer, than the delay exists in both directions (approx. 1 second delay total).

Most Internet Protocol traffic occurs over a TCP layer which assures the integrity of the communication session; it makes the underlying IP transport reliable. TCP uses extensive 'handshaking' between the two communicating sites, which unfortunately makes it highly exposed to latency as each of the interactions between the sites must traverse the network.

In downloading a typical web page composed of many individually retrieved elements a unidirectional satellite route nominally described as providing 400 kbit/s downstream throughput may actually load the page slower than a 56 kbit/s dial-up link because the latency in the satellite route causes a delay as each element in the web page is requested, sent, and acknowledged. TCP throughput is fundamentally limited by latency combined with the TCP window size. The TCP/IP protocol incorporates several features which make it work poorly over high latency links, in particular the high number of acknowledgements to verify correct reception of packets, and the 'slow start' feature of TCP where the sending rate is gradually increased over time. Most satellite equipment manufacturers have introduced both standard and proprietary modifications to the standard TCP/IP protocol suite in order to minimize these effects, for example by generating using the Internet Engineering Task Force RFC2018 TCP Selective ACK to avoid communications waiting for acknowledgements to traverse the high latency satellite route. Some of the other standardized mechanisms include RFC2488 "Enhancing TCP over Satellite Channels using Standard Mechanisms", RFC1191 "Path MTU", and RFC1323 "Large Windows". Some of these modifications such as TCP protocol spoofing will not work with certain applications; for example IPsec VPN sessions that encrypt the TCP and IP headers. These modifications also have no effect for UDP traffic, which is the basis for most Voice over IP sessions, a key latency sensitive application.

Satellite routes are also generally prone to higher bit error rates than terrestrial routes. The TCP protocol assumes that lost packets are due to congestion in the network, even if bit errors across a satellite route were the real reason. When satellite bit errors occur, TCP will therefore throttle back senders and reduce throughput which degrades service performance and yet has no positive impact on the packet loss rate. TCP will therefore perform better over terrestrial routes for reasons of congestion control mechanisms as well as for latency reasons.

Latency is a critical issue for some but not all applications. Latency is critical for many applications, including Voice, Video-telephony, most online-gaming, Citrix and other thin client applications, Terminal emulators without local echo (e.g. Telnet), PC remote control applications, and online chat. Moderately latency sensitive applications include web browsing and video streaming between a user and their multicast distribution point (due to the need for prompt channel change times). Latency insensitive applications include ftp file transfers, smtp email updates, nntp news updates/Usenet traffic, peer-to-peer file sharing applications, refresh traffic for distributed web caches, broadcast video, and most unicast streaming video.

Voice for example starts degrading substantially in quality when the round trip delay exceeds 200 ms, and special echo cancellation techniques are required. When the voice signal is digitized and transported over Internet Protocol, then latency is even more critical because the encoding and decoding process itself introduces delay.

Many computer systems operating within companies have been programmed with the assumption that the network interconnecting different processing nodes has a known fixed delay, as in fact was true with pre-packet time division multiplexed data networks or in local area terrestrial networks. When the link between two processing nodes in this internal corporate network exceeds the expected latency, it will typically assume that either the network or the remote node has failed and take drastic corrective action such as terminating the session and restarting the associated processing tasks.

General Internet Protocol routers do not examine traffic characteristics to determine which traffic is latency sensitive and do not consider physical link performance characteristics when making forwarding decisions.

The inability of the network to distinguish between the applications it carries is made particularly vivid by recent experience of service providers with peer-to-peer applications such as Kazaa, Morpheus, and Napster. In some parts of the network these applications now constitute over 50% of total traffic volume. They are unusually likely to cause network congestion because they are as likely to be uploading traffic as downloading. Although they are insensitive to latency themselves, they may cause congestion which damages latency and loss sensitive applications.

Current systems deal with latency requirements of the access network by selecting terrestrial or satellite routes according to latency requirements, as for example described in U.S. Pat. No. 6,591,084: "Satellite based data transfer and delivery system" (Chuprun et al.) and related U.S. published Patent application 20030203717: "Satellite based data transfer and delivery system" describe a system for wireless access that has satellite and optionally terrestrial network links. A satellite or terrestrial route is selected based on automatic user node affiliation or user profiles, which may include service cost limitations and allowable delay limitations. As a result, the switching/forwarding decisions are static being based on user profiles and node affiliations and not on real-time inspection of the actual traffic flow. There is a need to provide a system that is more adaptive to changes in traffic patterns and content, for obtaining a more efficient utilization of the satellite and terrestrial network links.

Other prior art solutions that have only satellite network links to access systems for addressing specific requirements. For example, U.S. Patent Application 20030109220: "Communication satellite adaptable links with a ground-based wideband network" (Chuprun et al.) describes basically a land-based network with hub nodes that have satellite routes to remote end-user systems. A communication manager determines the communications requirements between the satellite and the network, and can identify multiple hub nodes for communication with the network if the capacity of a given hub is insufficient to meet the requirements. However, the forwarding of the communication manager is not based on the latency sensitivity of the traffic, and the architecture presents only satellite routes to the end-user systems and not terrestrial ones.

U.S. Patent Application 20030032391: "Low latency handling of transmission control protocol messages in a broadband satellite communications system" (Schweinhart et al.) addresses latency sensitivity of traffic transmitted over satellite communications by queueing and scheduling the traffic for transmission according to its latency limitations. Again, this architecture presents only satellite routes to the end-user systems and not terrestrial ones, so that these systems can not provide any guidance on using alternative types of links, e.g. high-speed terrestrial routes, to reduce latency.

The prior art satellite based access system is a system to give priority to certain users. The invention described is a system to give priority to certain traffic types or applications.

Therefore, viewing the prior art as a whole, an access system for selectively forwarding traffic on satellite and terrestrial routes according to real-time requirements of the traffic and its type is neither disclosed nor suggested. The present invention is directed to such a system.

SUMMARY OF THE INVENTION

It is an object of the invention to provide a broadband hybrid satellite/terrestrial network architecture that optimally matches the performance requirements and priority of data applications to the characteristics of multiple communication links over which that data can be carried.

It is another object of the invention to provide a broadband satellite/terrestrial network architecture that enhances the quality and cost effectiveness of broadband solutions for subscribers in low populated, remote locations (rural locations).

Accordingly, the invention provides a hybrid satellite-terrestrial multiplexer for providing broadband services to a plurality of end-user systems, comprising: a multiplexer for combining data received from said end-user systems into an upstream traffic flow; and a specialized forwarding unit for segregating said upstream traffic flow received form said multiplexer, into a terrestrial traffic flow and a satellite traffic flow, and routing said terrestrial traffic flow along a terrestrial route and said satellite traffic flow along a satellite route, wherein said terrestrial route connects said specialized forwarding unit to a terrestrial network and said satellite route connects said specialized forwarding unit to a satellite network.

The invention also provides a specialized forwarding unit for forwarding a traffic flow over one of a satellite route and a terrestrial route, comprising: a traffic splitting unit for segregating the traffic flow into a terrestrial traffic flow and a satellite traffic flow; a terrestrial route interface for converting the format of the terrestrial traffic flow from a forwarding unit protocol to a terrestrial protocol used for communication along the terrestrial route; a satellite route interface for converting the format of the satellite traffic flow from the forwarding unit protocol to a satellite protocol used for communication along the satellite route; and traffic monitoring means for characterizing the traffic flow, and controlling the traffic splitting unit to recognize the terrestrial traffic flow and the satellite traffic flows based on traffic recognition rules and current traffic performance data.

According to a further aspect, the invention is directed to a method for providing broadband services to a plurality of end-user systems connected to a customer access system, comprising: (a) combining data received from the end-user systems into an upstream traffic flow; and (b) segregating the upstream traffic flow into a terrestrial traffic flow and a satellite traffic flow for forwarding the terrestrial traffic flow along a terrestrial route, and the satellite traffic flow along a satellite route, wherein the terrestrial route and the satellite route connect the specialized forwarding unit to far-end specialized forwarding unit.

Such intelligent splitting of the traffic to take advantage of multiple links with different characteristics may be implemented either in a service providers network, for example for the connectivity from the network core to a DSLAM in a remote community, or in a 'Direct Broadcast Satellite' where the upstream traffic splitting occurs in the customers' premises.

Splitting and different forwarding of different application traffic is not possible for packets within an IP tunnel, such as within a PPPoE session. It is therefore a requirement of this invention that the IP traffic not included applications requiring different handling within a tunnel, either through termination of the tunnel in the access multiplexer before examination by the customer end specialized forwarding unit, or never tunneled in the first place, for example by the use of DHCP authenticated high speed internet connections.

The solution of the present invention has the advantage of being adaptive to changes in traffic patterns and content. This adaptability results in higher performance outcomes for end customers for any given mix of satellite and terrestrial assets. It enables basic services such as high speed Internet to be delivered more cost effectively, but also allows higher value services, such as Voice over IP, to be supported thereby making rural broadband access more commercially feasible.

Also, the invention enables a service provider to deploy high quality and cost effective broadband solutions, leveraging the ability to sell broadband access into rural nodes where backhaul costs previously meant that coverage was too expensive.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
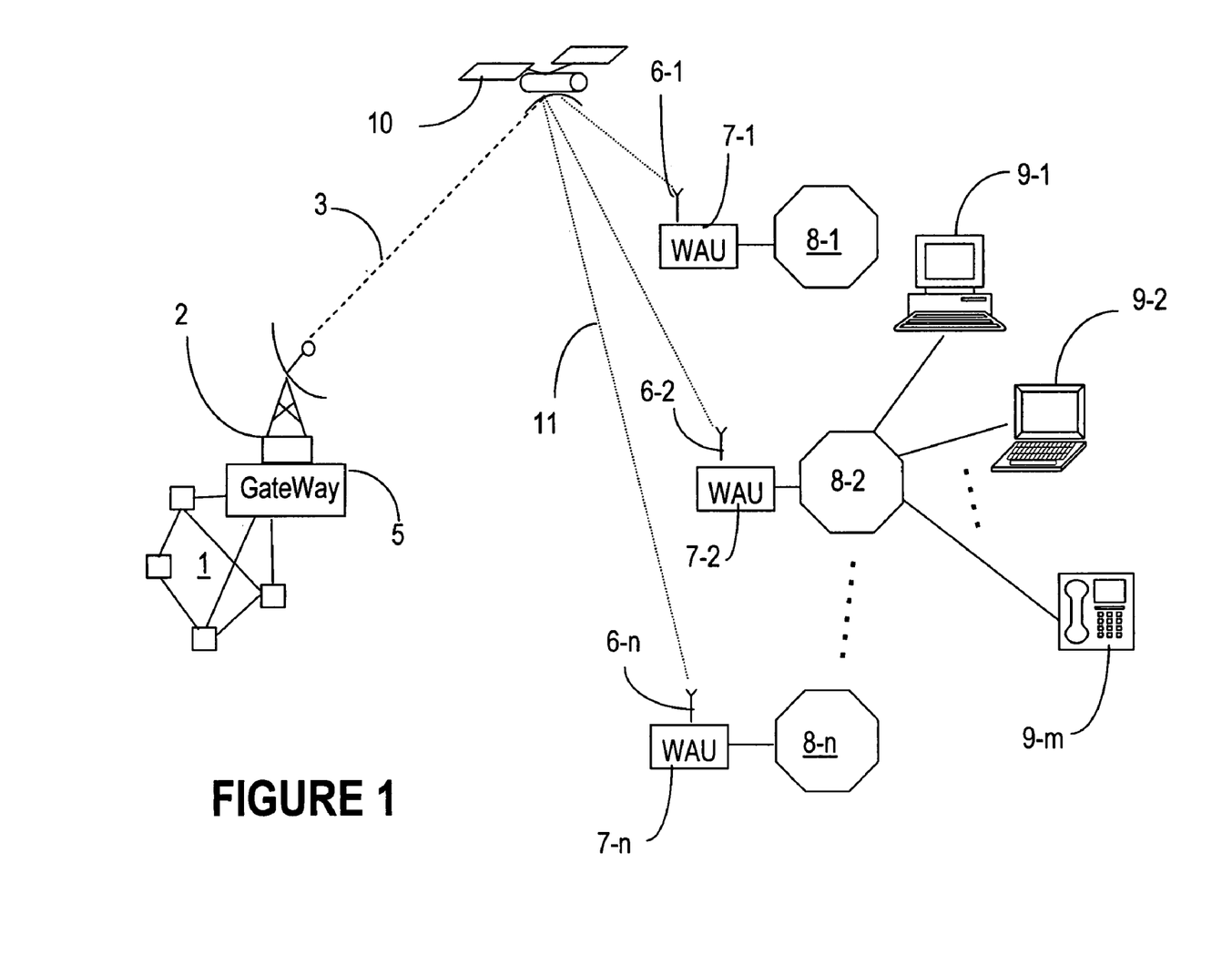
FIG. 1 is a block diagram of a prior art satellite based access system for providing a plurality of users with high rate, low latency data.

The system provided by the above identified UP Patent is described next with a view to better understanding the operation and advantages of the present invention. FIG. 1 shows a satellite based access system for providing a plurality of users with high rate, low latency data, as for example proposed in the above-referenced U.S. Pat. No. 6,591,084 (Chuprun et al.). In this example, a satellite 10 is connected to a ground antenna 2 in communication with a gateway 5, connected to a terrestrial network 1 (PSTN, ISDN, IP, etc). Satellite 10 may be accessed by a plurality of base stations 6-1 to 6-n at a plurality of cell sites 8-1 to 8-n. The base stations perform seamless protocol conversion and multiport distribution of the satellite signals to each user in the respective cell.

Each cell enables a different type of data service, tailored to the user requirements of each cell population. For example, cell 8-2 could comprise a medical campus, in which case the services provided within this cell include collection and exchange of patient records, outpatient data, X-rays, insurance data, billing information, etc. Each cell has a wireless access multiplexer (WAU) 7-1 to 7-n, each shared by a plurality of users 9-1 to 9-m. This avoids that each user communicates directly with the satellite, which would require a separate high cost transceiver and respective satellite antenna with proper placement for satellite visibility.

While it refers to a hybrid satellite-terrestrial network, the system of FIG. 1 is static, in that static switching/forwarding decisions are based on user profiles and user affiliations to the base station and not the current (real-time) parameters of the traffic flow. As such, the system of FIG. 1 does not perform dynamic forwarding of the traffic between a satellite and a terrestrial network based on the traffic priority as in the present invention.

Figure 2:
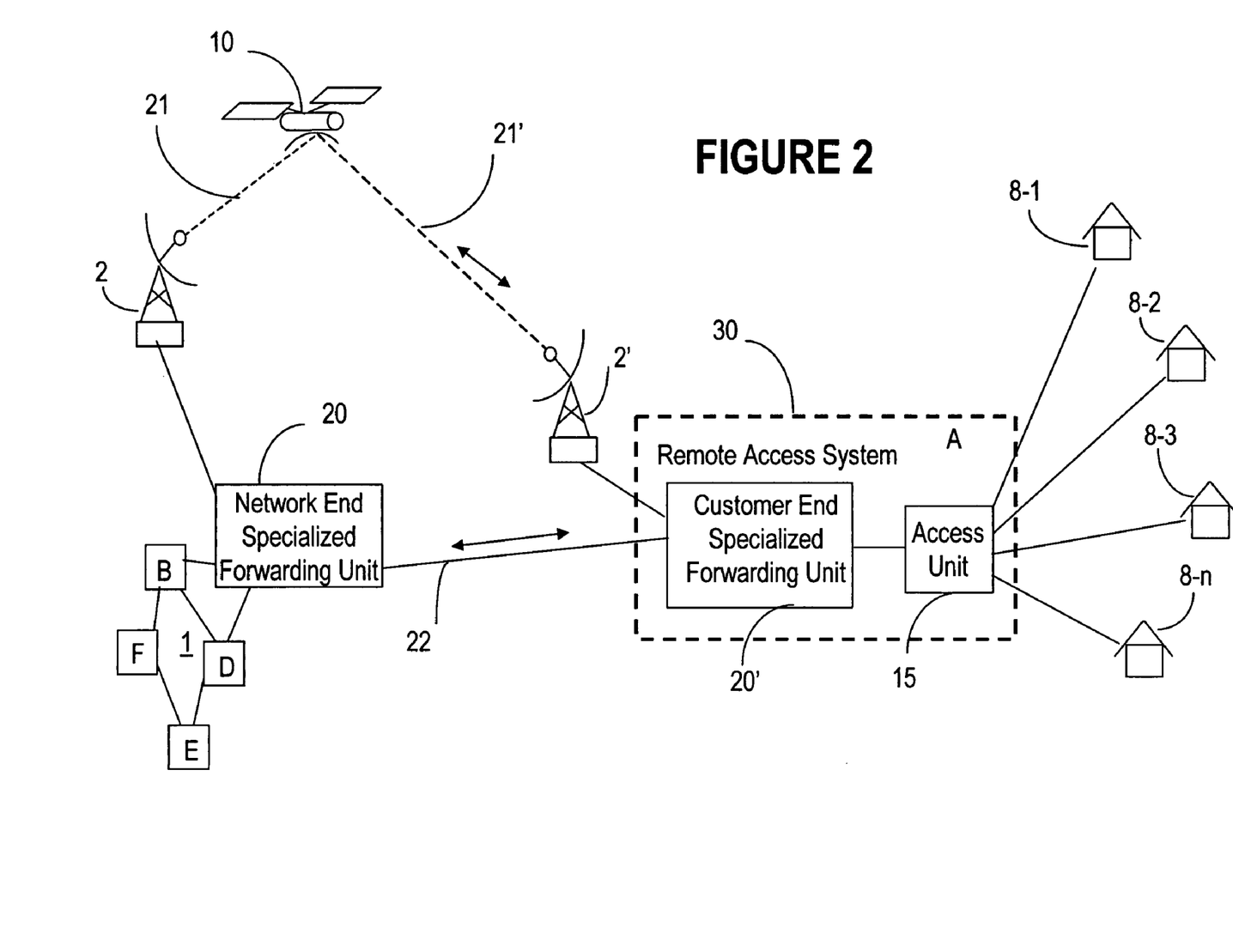
FIG. 2 is a block diagram of the hybrid satellite-terrestrial access system according to an embodiment of the invention as it would be deployed in a service provider's network.

The present invention relates to the field of broadband access systems, and could be used to service subscribers in rural locations, as shown in FIG. 2. In this example, a plurality of users 8-1 to 8-n dwelling in a remote area are connected to an access node A using an access multiplexer 15. This specification refers to the direction from the network to the customer as the "downstream" (or "forward", or "inbound") direction, and to the direction form the customer to the network as the "upstream" (or "reverse", or "outbound" direction"). It is to be understood that these are relative terms (relative to the specialized forwarding units 20 and 20'); other terms may be equally used to define these directions.

Access multiplexer 15 distributes the broadband access data received from network 1 to remote users 8-1 to 8-n in the forward (downstream) direction, and combines the local traffic from remote users 8-1 to 8-n into the broadband access data destined to network 1 in the reverse ('upstream') direction. Access multiplexer 15 could be for example an access multiplexer/demultiplexer (DSL or wireless, etc).

Remote node A is connected to network 1 over a terrestrial route 22, enabling bidirectional communication between the users at access node A and subscribers on network 1 connected at any access node B-F. For example, in case of a bidirectional A-B connection, the traffic sourced by e.g. a node B travels to the remote node A along network 1 and along terrestrial route 22. Similarly, the traffic sourced by remote node A travels to node B along terrestrial route 22 and is forwarded/switched by network 1 to node B. We define such a connection as a terrestrial route. Such a terrestrial route 22 will typically be low latency but also limited bandwidth.

It is to be noted that network 1 and terrestrial route 22 may employ any form of physical media such as wireless, wired optical, coaxial cable or twisted pair copper cable. It is also to be noted that the OSI Layer 2 communication protocol used by network 1 and terrestrial route 22 is irrelevant, i.e. it could be SONET, other TDM technology, Frame Relay, ATM, Ethernet, MPLS, or combinations thereof.

To provide broadband services to users 8-1 to 8-n, connectivity must be established between those users and multiple remote hosts, say at Node B. The capacity and performance of the network will determine the number of users that can receive service, the quality with which that service operates, and the set of services that can be supported.

To increase the number of users, the quality, or the set of services may involve augmenting the capacity of the terrestrial route 22, which may be a very expensive proposition, for example where link 22 is a series of digital microwave radio links.

In order to augment the capacity of the terrestrial route 22, a satellite route is installed in parallel to the terrestrial route. The idea of the invention is to split the traffic of a connection using terrestrial route 22 between the terrestrial route 22 and a satellite connection. Network 1 may be already fitted with satellite capabilities, i.e. a satellite antennae and the respective gateway as shown at 2 may already be installed. For the purpose of this invention, a satellite antenna and the respective gateway 2' is installed at access node A to access satellite 10 and the nodes of network 1 over the satellite routes 21, 21'.

Traffic is split between the terrestrial and satellite routes using a first specialized forwarding unit 20 at a node C of network 1 and a second specialized forwarding unit 20' at the remote access node A. The forwarding units switch the traffic along the respective satellite or terrestrial route based on pre-established traffic rules. For example, in each direction, the respective forwarder 20, 20' identifies latency sensitive and latency insensitive traffic, and forwards the traffic accordingly. More specifically, since the terrestrial route is protected, the latency sensitive traffic is preferably forwarded/switched over the terrestrial route 22 and the latency insensitive traffic is forwarded/switched over the satellite route 21, 21'. In this way, forwarders 20 and 20' make the decision about what kind of traffic need the higher performance forward in the respective direction of traffic.

In the downstream direction (B-A), the traffic sourced by node B is filtered by network end specialized forwarding unit 20 according to its priority in this example. As a result, the latency insensitive traffic (in this example) is forwarded to antenna 2, then to satellite 10 on uplink 21, to antenna 2' on downlink 21' and then to node A. An example of latency insensitive traffic would be an ftp file download. The latency sensitive traffic is forwarded/switched on terrestrial route over network 1, and then to access node A over terrestrial route 22. An example of latency sensitive traffic would be a Voice over IP session. At customer end specialized forwarding unit 20', the traffic from the terrestrial and satellite routes is combined and forwarded to access multiplexer 15 for distribution to users 8-1 to 8-n.

In the reverse (upstream) direction, the traffic sourced by a users 8-k connected to access node A is combined with the traffic sourced by all users 8-1 to 8-n at access multiplexer 15, and then filtered by customer end specialized forwarding unit 20' according to its priority. The latency insensitive traffic is forwarded/switched to antenna 2', then to satellite 10 on uplink 21', to antenna 2 on downlink 21 and then to the network end specialized forwarding unit 20. The latency sensitive traffic is forwarded/switched along the terrestrial route 22 and then over network 1, to the network end specialized forwarding unit 20. At unit 20, the traffic from the terrestrial is combined with the traffic from the satellite route and the combined traffic is forwarded to the destination node (let's say node B), based on the respective destination address, as well known.

Depending on the nature of the traffic and bandwidth, the traffic filtering function may occur at the network end for terrestrial traffic downstream to the customer, at the customer end for traffic upstream from the customer, or at both locations.

In addition, although this mechanism has been described in terms of a bidirectional satellite route, it is also possible to use one-way satellite communications. Either link type may also have more bandwidth available in one direction than the other.

Figure 3:
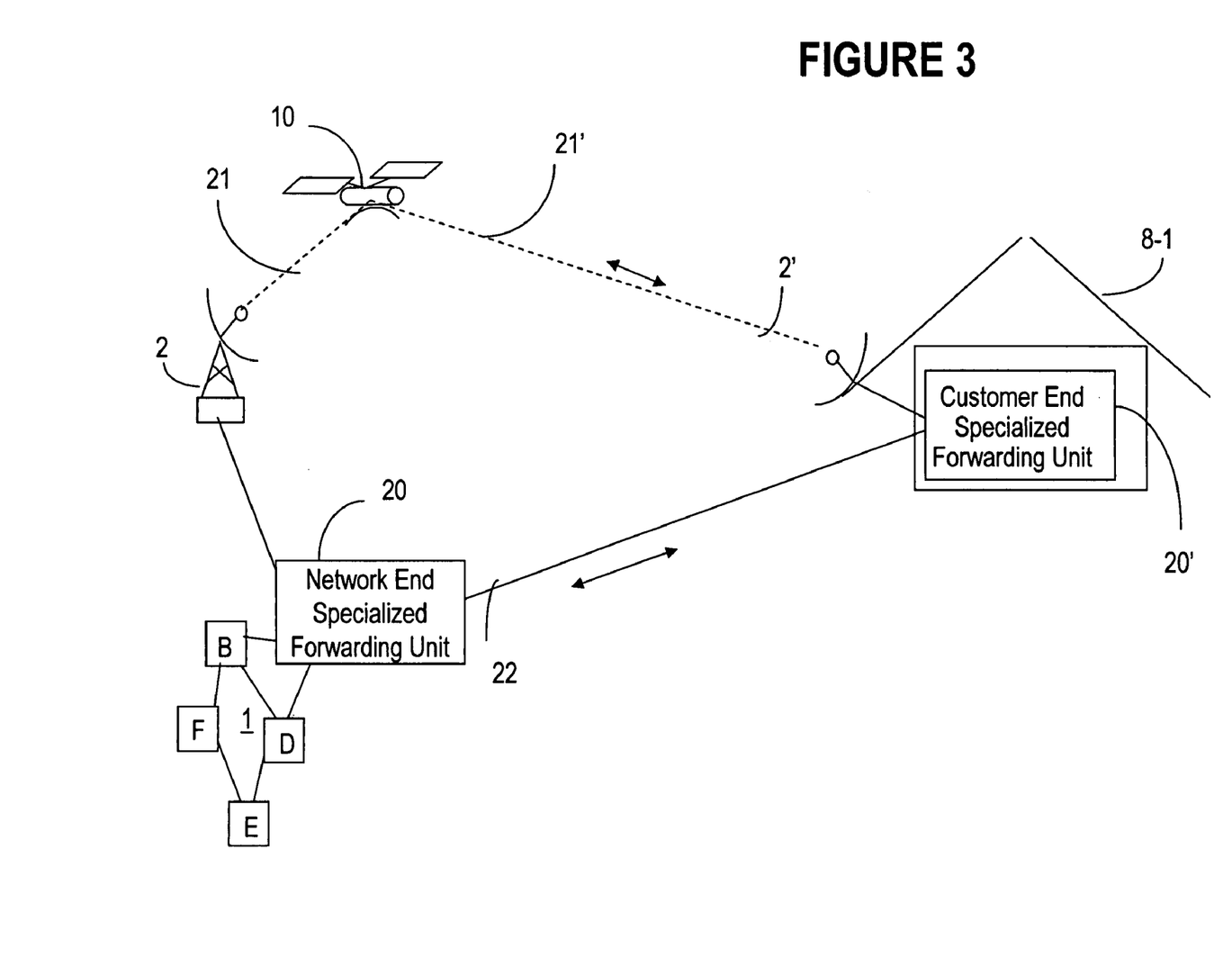
FIG. 3 is a block diagram of the hybrid satellite-terrestrial access system according to another embodiment of the invention as it would be deployed with the customer end specialized forwarding unit implemented in an end-customer's premises.

The mechanism has been described in a configuration that would be used by a service provider. It is also possible that the satellite transceiver 2' and the customer end specialized forwarding unit 20' be implemented in a piece of equipment directly at a customer's premises. This case is shown in FIG. 3. In this case there is a satellite route and a terrestrial route per customer instead of a satellite route and terrestrial route shared among many customers as described in FIG. 2.

This terrestrial/satellite traffic splitting mechanism is efficient for the distribution of unicast and especially multicast streaming video via the satellite route. In some cases this may be more cost effective even in urban situations because it allows a large amount of content to be distributed to multiple access points without augmenting the terrestrial capacity.

Figure 4:
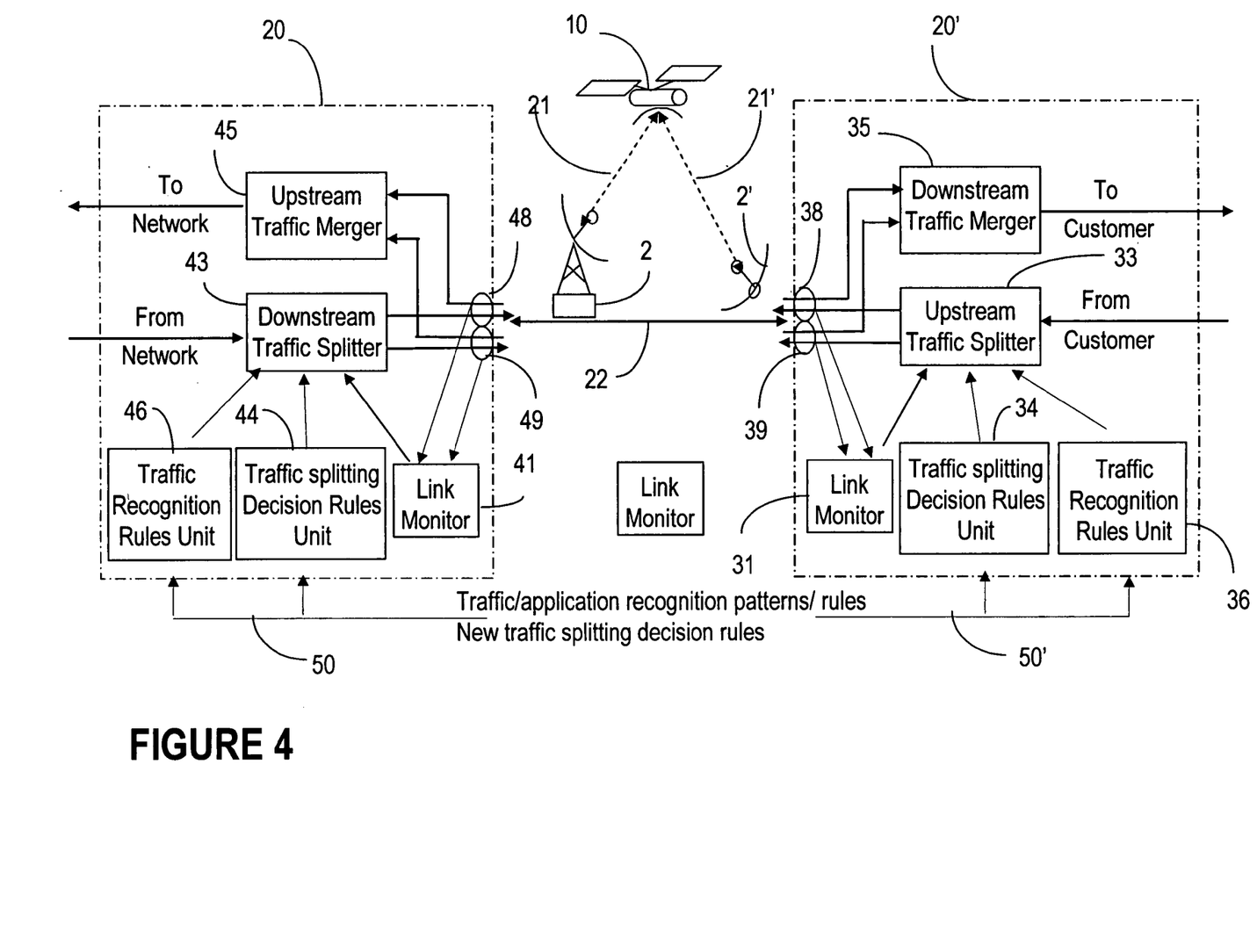
FIG. 4 is a block diagram of the specialized forwarding unit according to an embodiment of the invention.

Details of the mechanism employed in both network end specialized forwarding unit (system) 20 and customer end specialized forwarding unit 30 are shown in FIG. 4. It is to be noted that these units have a similar configuration, with the difference that unit 20 is connected to the network 1 and the satellite antenna 2, while the customer unit 30 is connected to the customer premise and to the antenna 2'. In this drawing, the traffic forwards are illustrated with continuous thicker lines, the satellite routes are shown with dotted lines and the provision/control paths are shown in thinner lines.

The forwarding units are connected to the terrestrial and satellite routes through interfaces 38, 48 and 39,49 respectively. The interfaces are preferably bidirectional. In the downstream direction, interface 38 processes the downstream traffic flow received over the satellite route 21' and interface 39 processes the downstream traffic flow received over the terrestrial route 22. Similarly, interface 48 processes the downstream traffic flow to be transmitted over the satellite route 21 and interface 49 processes the downstream traffic flow to be transmitted over the terrestrial route 22.

Each forwarding units 20 and 20' uses a respective traffic merger 35 and 45 that combines the traffic from the two forwards. Thus, downstream traffic merger 35 at customer end specialized forwarding unit 20' combines the traffic from satellite route 21' and terrestrial route 22 and forwards the combined downstream traffic to the customer. Similarly, upstream traffic merger 45 combines the traffic from satellite route 21 and terrestrial route 22 and forwards the combined upstream traffic to the network 1.

A link monitor 31, 41 observes the IP traffic flows at the respective interface 38,39 and respectively 48, 49 for measuring the current performance of the forwards. Also, link monitor 31, 41 provides this current performance data to a respective traffic splitter 33, 43 to control traffic separation at the respective splitter. The link monitor 31, 41 may also inject its own test data into the data stream to provide the basis for assessment of link quality to another link monitor at the other end of the hybrid satellite/terrestrial routes.

The splitter 33, 43 uses three key sources of information to decide how the traffic is split on the respective satellite route 22, 22' and terrestrial route 22.

The first information source is from a traffic recognition rules unit 36, 46. This unit provides the rules by which individual packets are identified as being associated with a known application, communicating entity, or priority. A traffic recognition rule might for example look like the following: "If the Port number is 25 than the application type is Mail"

The second information source is a traffic splitting decision rules unit 34, 44 which provides the rules by which the splitting unit will decide how to forward traffic which as been identified, that is what kinds of traffic should be forwarded on which link type. This may involve rules that are organized according to priority, where a high priority rule (what to do if a link fails) takes priority over a lower priority rule (what to do under normal conditions). A traffic splitting decision rule might look like the following: "If terrestrial route availability status is normal, then forward VoIP traffic over terrestrial route".

The third information source is the link monitor 31, 41. The link monitor provides real-time information on the availability and performance of the links. This information is used in combination with the traffic splitting rules and the recognition of inbound traffic to dynamically change the traffic splitting decision on the basis of changing conditions.

In order to perform traffic splitting, a traffic recognition rules unit 36, 46 examines the traffic provided by the customer/network and matches the traffic against defined profiles and patterns. The identification (recognition) of the traffic by unit 36, 46 may be based on any combination of IP port, protocol, Source/destination MAC address, unicast versus multicast address type, DSCP or 802.1p priority markings, packet size, or other information contained in the packet. For example a traffic recognition rule could be: "If Port=119, then application=Network News".

Identification within the traffic recognition rules unit 36, 46 may also be based on a pattern of information in packets over time. For example the identification of traffic may include knowledge of application behavior up to OSI layer 7; such as for the identification of real-time communications traffic that may use knowledge of the H.323 or SIP protocols to identify IP flows based on their behavior over time in a 'stateful' fashion.

Traffic recognition rules may be set up dynamically based on observing the traffic. For example, when a client 'Joe' sends an ftp request to port 21 on a server, the port number which will be used for the latency insensitive data connection will be sent either by the client with a "PORT xxx" command, or the client will send "PASV" to signal a passive mode transfer and the server will return the server port number (say port xxx again) to be used for the data connection. This would generate a dynamic traffic identification rule for example that says "If destination IP address={Joe's IP address} and Port=xxx, then application=file transfer".

Information used for traffic recognition may also employ information which can be derived from information in the packet such as host DNS address or URL but is not contained in the packet header.

Further, information relating to the behavior of specific applications, such as the long-lived flows associated with certain peer-to-peer applications or the high cumulative transfer volume associated with streaming video may be used to identify specific flows for forwarding purposes. The classification of traffic may also incorporate monitors looking at the traffic mix to detect hard to spot application types, especially peer-to-peer applications like Morpheus and Kazaa and update the flow forwarding policy.

The splitting decision rules unit 34, 44 may also control the forwarding behavior of the splitter based on load (from the link monitor 31, 41) and the link capacity as configured through the management interface 50, 50'. For example, "During off-peak periods all traffic takes the terrestrial route, and overflow is always carried on the satellite route".

Other splitting decision rules may be based on availability or performance of each of the links as reported through the management interface 50, 50' or by observation within the link monitor 31, 41. So for example, the satellite might normally be used only as an 'overflow' link, but in the event of problems with the terrestrial route, the satellite would pick up all traffic. A small amount of satellite route bandwidth might therefore offer protection for a large number of geographically distributed terrestrial routes.

In addition to the case where the service provider defines the filtering criteria on all traffic from all customers, the filtering may also allow customers to use the higher performance terrestrial route for a premium. This allows the forwarding decision to be made on customer signaled traffic priorities, and it allows 'customer priority' to be mixed with 'application priority'. For example, a user could be given preferential access to the terrestrial route for web browsing traffic, if that terrestrial route is not needed for higher priority voice over IP traffic. In this case, the subscribers to this service may be identified by incoming interface, Layer 2 identification (VCI or VLAN id, source IP or MAC address). Still further, specific portions of a customer's traffic may be forwarded on the higher performance terrestrial route. These portions may be identified by markings that have been applied to traffic by the customer such as Diffserv code point, 802.1p priority setting or other priority marking mechanism.

The traffic recognition rules unit 36, 46 and traffic splitting decision rules unit 34, 44 are typically statically provisioned into any given specialized forwarding unit, and may be updated from time to time through a management interface, as shown at 50, 50'.

The specialized forwarding units may also be implemented in a split fashion where one unit identifies and marks the traffic according to how it should be carried, and a separate unit implements the forwarding based on the labels that have been applied.

I claim:

1. A hybrid satellite-terrestrial unit for providing broadband services to a plurality of end-user systems, comprising:
   a multiplexer for combining data received from said end-user systems into an upstream traffic flow; and
   a specialized forwarding unit comprising:
      a link monitor that measures current performance data for the upstream traffic flow,
      a traffic splitting unit that controls separation of said upstream traffic flow received from said multiplexer into a terrestrial traffic flow and a satellite traffic flow based upon traffic recognition rules, priority levels of the traffic recognition rules, and the measured current performance data, and
      means for routing said terrestrial traffic flow along a terrestrial route and said satellite traffic flow along a satellite route,
   wherein said terrestrial route connects said specialized forwarding unit to a terrestrial network and said satellite route connects said specialized forwarding unit to a satellite network.

2. The hybrid satellite-terrestrial unit of claim 1, wherein said specialized forwarding unit further comprises:
   a terrestrial route interface for converting a format of said terrestrial traffic flow from a routing unit protocol to a terrestrial protocol used for communication along said terrestrial route; and
   a satellite route interface for converting a format of said satellite traffic flow from said routing unit protocol to a satellite protocol used for communication along said satellite route.

3. The hybrid satellite-terrestrial unit of claim 2, further comprising a traffic recognition rules unit for storing said traffic recognition rules.

4. The hybrid satellite-terrestrial unit of claim 3, further comprising a management interface for updating said traffic recognition rules.

5. The hybrid satellite-terrestrial unit of claim 2, wherein said terrestrial and said satellite route interfaces are bidirectional.

6. The hybrid satellite-terrestrial unit of claim 5, wherein said specialized forwarding unit further comprises a traffic merging unit connected to said terrestrial and satellite route interfaces, for
   combining a downstream terrestrial traffic flow received via said terrestrial route with a downstream satellite traffic flow received over said satellite route and providing a downstream traffic flow to said multiplexer.

7. A specialized forwarding unit for routing a traffic flow over one of a satellite route and a terrestrial route, comprising:
   a link monitor for measuring current performance data of the traffic flow;
   a traffic splitting unit that controls separation of said traffic flow into a terrestrial traffic flow and a satellite traffic flow based upon traffic recognition rules, priority levels of the traffic recognition rules, and measured current performance data;
   a terrestrial route interface for converting a format of said terrestrial traffic flow from a routing unit protocol to a terrestrial protocol used for communication along said terrestrial route; and
   a satellite route interface for converting a format of said satellite traffic flow from said routing unit protocol to a satellite protocol used for communication along said satellite route.

8. The specialized forwarding unit of claim 7, further comprising traffic monitoring means for characterizing said traffic flow, wherein said traffic monitoring means comprises
a traffic recognition rules unit for storing traffic recognition rules.

9. A method for providing broadband services to a plurality of end-user systems connected to a customer access system, comprising the following steps:
   combining data received from said end-user systems into an upstream traffic flow;
   monitoring the upstream traffic flow to measure current performance data; and
   splitting said upstream traffic flow into a terrestrial traffic flow and a satellite traffic flow for routing said terrestrial traffic flow along a terrestrial route, and said satellite traffic flow along a satellite route based upon traffic recognition rules, priority levels of the traffic recognition rules, and the measured current performance data;
   wherein said terrestrial and said satellite routes connect a specialized forwarding unit to a respective far-end specialized unit.

10. The method of claim 9, further comprising the step of monitoring said terrestrial and satellite traffic flows at said respective terrestrial and satellite interfaces for collecting current traffic performance data.

11. The method of claim 9, further comprising updating said traffic recognition rules.

12. The method of claim 9, further comprising the following steps:
   converting the format of said terrestrial traffic flow from a routing unit protocol to a terrestrial protocol used for communication along said terrestrial route; and
   converting the format of said satellite traffic flow from said routing unit protocol to a satellite protocol used for communication along said satellite route.

13. The method of claim 9, further comprising:
   combining a downstream terrestrial traffic flow received via said terrestrial route with a downstream satellite traffic flow received via said satellite route into a downstream traffic flow; and
   distributing said downstream traffic flow to said plurality of end-user systems.

14. A hybrid satellite-terrestrial network having a core end and an access end that provides broadband services to a plurality of end-user systems, comprising:
   satellite network links,
   terrestrial network links, an access multiplexer for combining data received from said end-user systems into an upstream traffic flow and distributing downstream data to said end-user systems, a first specialized forwarding unit at the access end of the network for splitting said upstream traffic from said access multiplexer to the core of the network via said satellite network links and said terrestrial network links and merging downstream data from the core of the network to said access multiplexer via said satellite network links and said terrestrial network links, the first specialized forwarding unit comprising:

a first link monitor that measures current performance data for the upstream traffic; and a first traffic splitting unit that controls separation of said upstream traffic received from said access multiplexer, into a terrestrial traffic flow and a satellite traffic flow based upon traffic recognition rules, priority levels of the traffic recognition rules, and the measured current performance data, and a second specialized forwarding unit at the core end of the network for splitting said downstream traffic from the core of the network to said access multiplexer via said satellite network links and said terrestrial network links and merging upstream data from said access multiplexer via said satellite network links to said terrestrial network links second specialized forwarding unit comprising:

a second link monitor that measures current performance data for the downstream traffic; and a second traffic splitting unit that controls separation of said downstream traffic flow into a terrestrial traffic flow and a satellite traffic flow based upon traffic recognition rules, priority levels of the traffic recognition rules, and the measured current performance data.

15. The hybrid satellite-terrestrial networking system of claim 14, wherein said first specialized forwarding unit further comprises:

a terrestrial route interface for converting the format of said terrestrial traffic flow from a forwarding unit protocol to a terrestrial protocol used for communication along said terrestrial route;

a satellite route interface for converting the format of said satellite traffic flow from said forwarding unit protocol to a satellite protocol used for communication along said satellite route.

16. The hybrid satellite-terrestrial networking system of claim 15, further comprising a traffic recognition rules unit for storing said traffic recognition rules.

17. The hybrid satellite-terrestrial networking system of claim 15, wherein said first link monitor injects test data into the upstream traffic to provided a basis for its assessment of current performance data.

18. The hybrid satellite-terrestrial networking system of claim 15, further comprising a management interface for updating said traffic recognition rules.

19. A method for providing improving the performance of broadband networks using parallel satellite and terrestrial routes, comprising the following steps:

monitoring an upstream traffic flow to measure current performance data splitting an inbound traffic flow into an outbound terrestrial traffic flow and an outbound satellite traffic flow based upon traffic recognition rules, priority levels of the traffic recognition rules, and the measured current performance data;

forwarding said outbound terrestrial traffic flow along said terrestrial route, and said outbound satellite traffic flow along said satellite route; and merging said inbound terrestrial traffic flow and said inbound satellite traffic flow.

20. The method of claim 19, further comprising the following step: storing and updating said traffic recognition rules.

21. The method of claim 19, further comprising the following step: using knowledge of the H.323 or Session Initiation Protocol (SIP) protocols to identify Internet Protocol (IP) flows based on their behavior.

22. The method of claim 19, further comprising updating said traffic recognition rules.

23. The method of claim 19, further comprising the following steps:

converting the format of said terrestrial traffic flow to and from a forwarding unit protocol to a terrestrial protocol used for communication along said terrestrial route; and converting the format of said satellite traffic flow to and from said forwarding unit protocol to a satellite protocol used for communication along said satellite route.

* * * * *